United States Patent
He et al.

(10) Patent No.: US 12,191,927 B2
(45) Date of Patent: Jan. 7, 2025

(54) MEASUREMENT RESOURCE FOR MEASURING A RECEIVED SIGNAL STRENGTH INDICATOR

(71) Applicant: QUALCOMM Incorporated, San Diego, CA (US)

(72) Inventors: Qunfeng He, San Diego, CA (US); Huilin Xu, Temecula, CA (US)

(73) Assignee: QUALCOMM Incorporated, San Diego, CA (US)

(*) Notice: Subject to any disclaimer, the term of this patent is extended or adjusted under 35 U.S.C. 154(b) by 358 days.

(21) Appl. No.: 17/645,587

(22) Filed: Dec. 22, 2021

(65) Prior Publication Data

US 2023/0198642 A1   Jun. 22, 2023

(51) Int. Cl.
*H04B 17/318* (2015.01)
*H04L 5/00* (2006.01)
*H04W 72/044* (2023.01)

(52) U.S. Cl.
CPC ......... *H04B 17/318* (2015.01); *H04L 5/0048* (2013.01); *H04W 72/044* (2013.01)

(58) Field of Classification Search
CPC ... H04B 17/318; H04L 5/0048; H04L 5/0051; H04L 5/001; H04L 5/0094; H04W 72/044
See application file for complete search history.

(56) References Cited

U.S. PATENT DOCUMENTS

| | | | |
|---|---|---|---|
| 2020/0169340 A1* | 5/2020 | Hwang | H04B 17/327 |
| 2020/0288337 A1* | 9/2020 | Callender | H04W 24/10 |
| 2020/0351690 A1* | 11/2020 | Zhu | H04B 17/24 |
| 2021/0045003 A1* | 2/2021 | Li | H04L 5/005 |
| 2022/0022073 A1* | 1/2022 | Zhang | H04W 24/08 |
| 2022/0124531 A1* | 4/2022 | Miao | H04B 17/345 |
| 2022/0124799 A1* | 4/2022 | Hu | H04L 5/0048 |
| 2023/0189382 A1* | 6/2023 | Haustein | H04W 76/20 370/329 |
| 2023/0276282 A1* | 8/2023 | Li | H04L 27/2613 370/329 |
| 2023/0284084 A1* | 9/2023 | Chae | H04L 5/0048 370/230 |
| 2023/0344592 A1 | 10/2023 | Zhou et al. | |
| 2023/0413088 A1* | 12/2023 | Sedin | H04W 24/08 |

* cited by examiner

*Primary Examiner* — Atique Ahmed
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a configuration of a measurement resource. The UE may perform a received signal strength indicator (RSSI) measurement within an active downlink (DL) bandwidth part (BWP) of the UE based at least in part on the measurement resource. Numerous other aspects are described.

30 Claims, 11 Drawing Sheets

MEASUREMENT RESOURCE FOR MEASURING A RECEIVED SIGNAL STRENGTH INDICATOR

FIELD OF THE DISCLOSURE

Aspects of the present disclosure generally relate to wireless communication and to techniques and apparatuses for a measurement resource for measuring a received signal strength indicator.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration of a measurement resource. The method may include performing a received signal strength indicator (RSSI) measurement within an active downlink (DL) bandwidth part (BWP) of the UE based at least in part on the measurement resource.

Some aspects described herein relate to a method of wireless communication performed by a base station. The method may include transmitting, to a UE, a configuration of a measurement resource, where the measurement resource is provided to the UE for the UE to perform an RSSI measurement within an active DL BWP of the UE based at least in part on the measurement resource.

Some aspects described herein relate to an apparatus for wireless communication at a UE. The apparatus may include a memory and one or more processors coupled to the memory. The one or more processors may be configured to receive a configuration of a measurement resource. The one or more processors may be configured to perform an RSSI measurement within an active DL BWP of the UE based at least in part on the measurement resource.

Some aspects described herein relate to an apparatus for wireless communication at a base station. The apparatus may include a memory and one or more processors coupled to the memory. The one or more processors may be configured to transmit, to a UE, a configuration of a measurement resource.

Some aspects described herein relate to a non-transitory computer-readable medium that stores a set of instructions for wireless communication by a UE. The set of instructions, when executed by one or more processors of the UE, may cause the UE to receive a configuration of a measurement resource. The set of instructions, when executed by one or more processors of the UE, may cause the UE to perform an RSSI measurement within an active DL BWP of the UE based at least in part on the measurement resource.

Some aspects described herein relate to a non-transitory computer-readable medium that stores a set of instructions for wireless communication by a base station. The set of instructions, when executed by one or more processors of the base station, may cause the base station to transmit, to a UE, a configuration of a measurement resource.

Some aspects described herein relate to an apparatus for wireless communication. The apparatus may include means for receiving a configuration of a measurement resource. The apparatus may include means for performing an RSSI measurement within an active DL BWP of the apparatus based at least in part on the measurement resource.

Some aspects described herein relate to an apparatus for wireless communication. The apparatus may include means for transmitting, to a UE, a configuration of a measurement resource, where the measurement resource is provided to the UE for the UE to perform an RSSI measurement within an active DL BWP of the UE based at least in part on the measurement resource.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
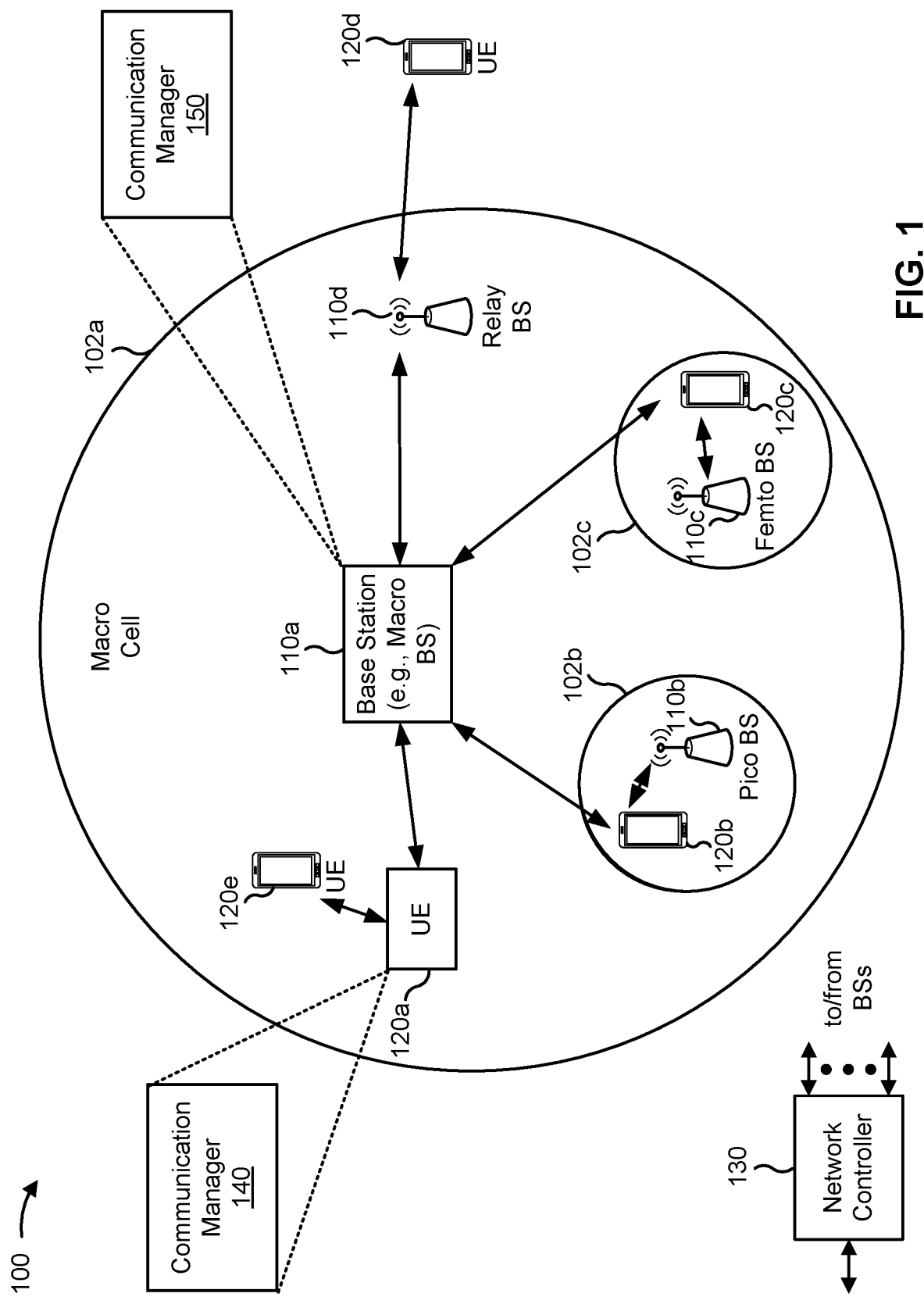
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a measurement resource; and perform a received signal strength indicator (RSSI) measurement within an active downlink (DL) bandwidth part (BWP) of the UE based at least in part on the measurement resource. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a measurement resource, wherein the measurement resource is provided to the UE for the UE to perform an RSSI measurement within an active DL BWP of the UE based at least in part on the measurement resource. Additionally, or alternatively, the communication manager 150 may perform one or more other operations described herein.

As indicated above, FIG. 1 is provided as an example. Other examples may differ from what is described with regard to FIG. 1.

Figure 2:
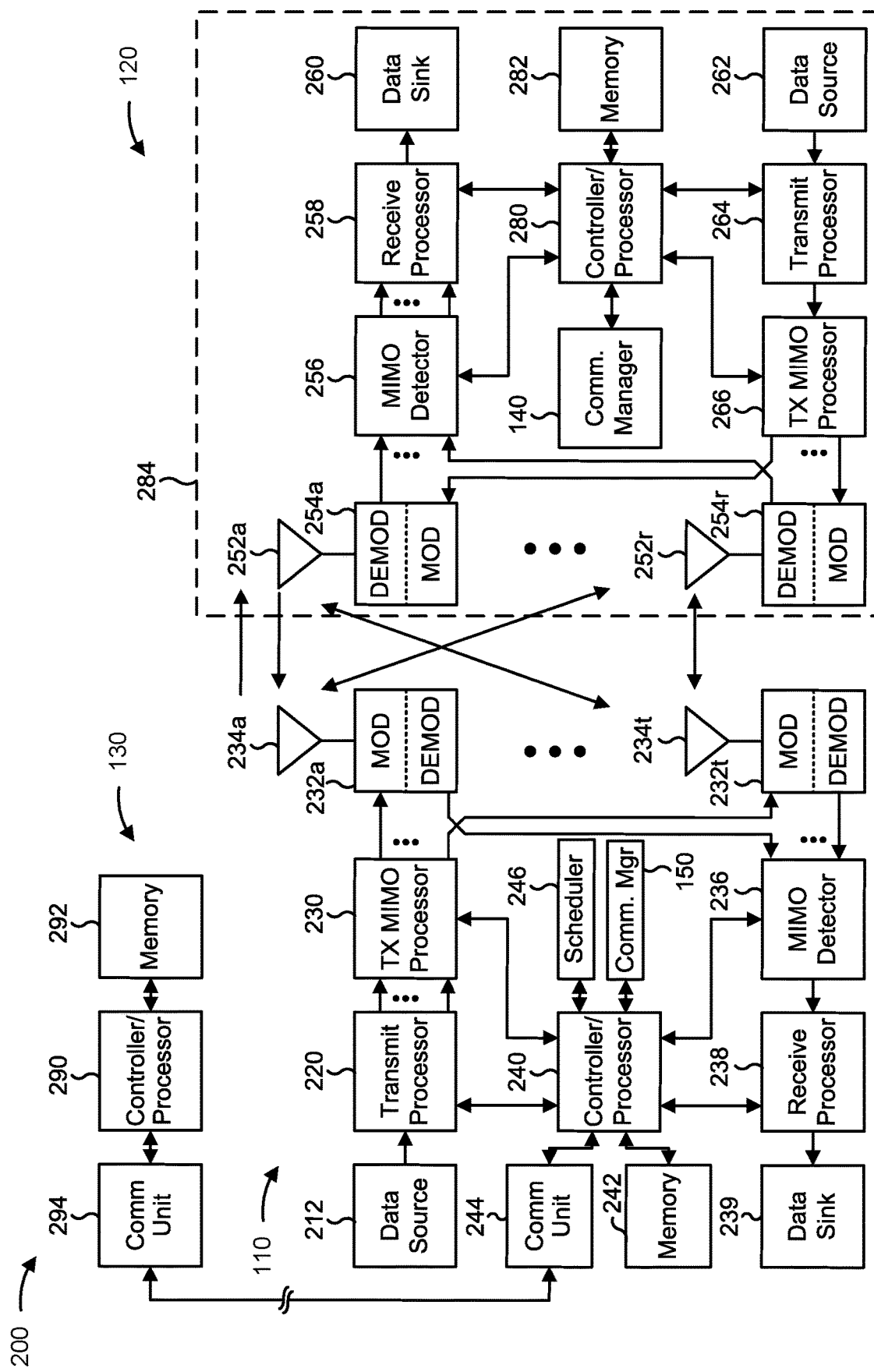
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, an RSSI parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-11).

The controller/processor 240 of the base station 110, the controller/processor 280 of the UE 120, and/or any other component(s) of FIG. 2 may perform one or more techniques associated with a measurement resource for measuring a received signal strength indicator, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving a configuration of a measurement resource (e.g., using transceiver (as described above), antenna 252, modem 254, MIMO detector 256, receive processor 258, controller/processor 280, memory 282, and/or the like); and/or means for performing an RSSI measurement within an active DL BWP of the UE based at least in part on the measurement resource (e.g., using transceiver (as described above), antenna 252, modem 254, MIMO detector 256, receive processor 258, controller/processor 280, memory 282, communication manager 140, and/or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a configuration of a measurement resource (e.g., using controller/processor 240, transmit processor 220, TX MIMO processor 230, modem 232, antenna 234, memory 242, communication manager 150, or the like), wherein the measurement resource is provided to the UE for the UE to perform an RSSI measurement within an active DL BWP of the UE based at least in part on the measurement resource. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
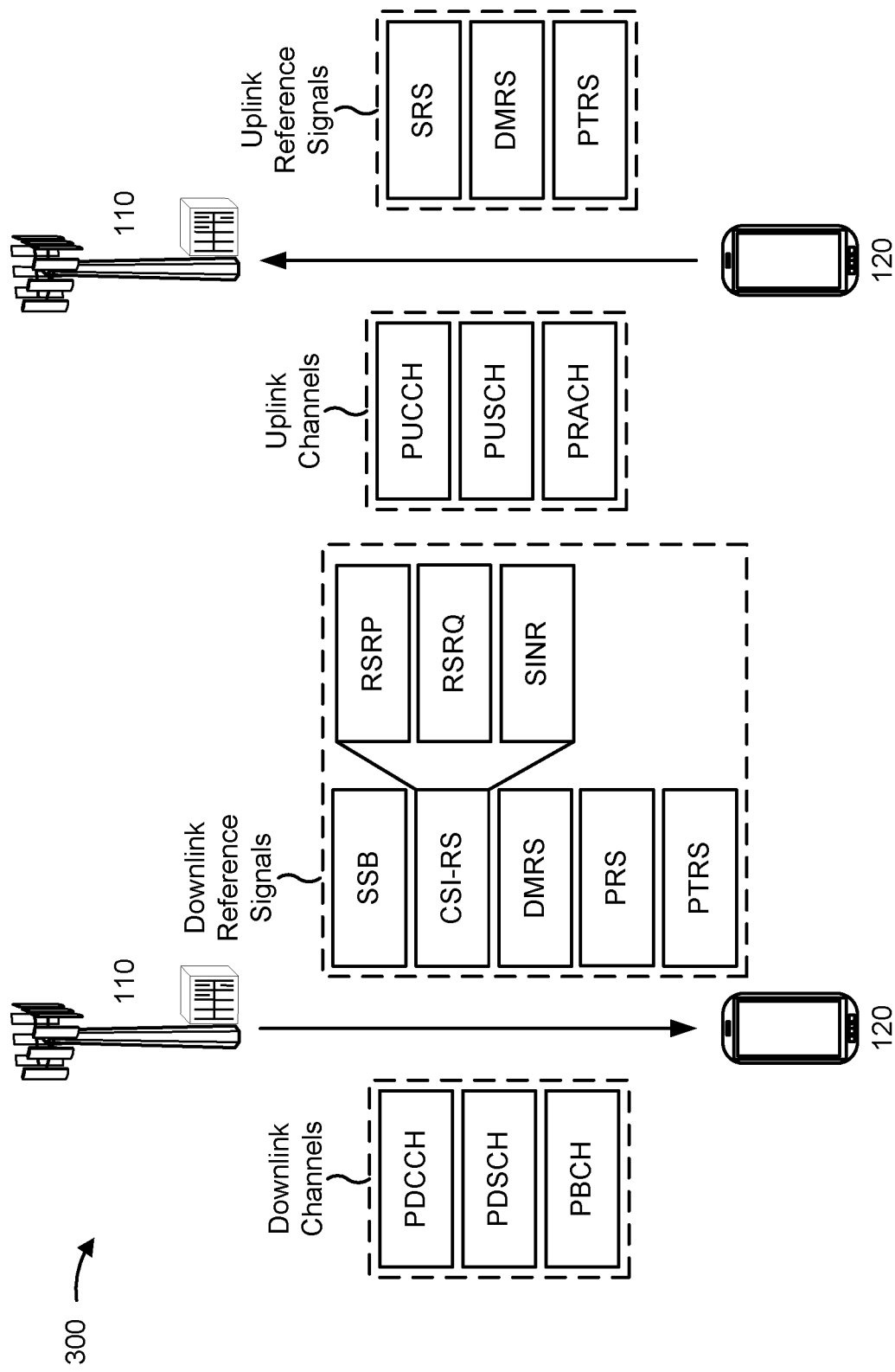
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), an RSRP parameter, an RSRQ parameter, a signal to interference plus noise (SINR) parameter, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

A multi-carrier user equipment, such as UE 120, may be configured with one or more receivers tunable to one or more frequency bands. Depending on the particular configuration of receivers, the UE 120 may need to tune away from the frequency band of its current serving cell to measure another frequency band from the serving cell or from a neighboring cell. Such measurements may be needed to assess the quality of a carrier channel before establishing a connection on the carrier, among other purposes. For example, one or more of the reference signals described above may be implemented for layer 3 (L3) measurement purposes. In some implementations, L3 may also be referred to as a radio resource control (RRC) layer. The 3GPP standard defines an L3 CSI-RS measurement resource to be used for SSB-based radio resource management (RRM) measurements for UE 120 mobility. The measurements performed by the UE 120 in accordance with the L3 CSI-RS measurement resource may be associated with an RSRP parameter, an RSRQ parameter, a SINR parameter, or similar parameter.

Each of these parameters (e.g., RSRP, RSRQ, SINR) require coherent demodulation of the corresponding reference signal, and thus if the receiver being actively utilized by the UE 120 to receive a downlink transmission is not tuned to the frequency band carrying the L3 CSI-RS reference signal, the UE 120 may need to stop data reception and tune to a different frequency band to properly measure the L3 CSI-RS reference signal. More particularly, in some instances a UE 120 may be receiving a data transmission on a PDSCH operating in a first frequency band having a first subcarrier spacing (SCS), sometimes referred to as an active DL BWP. Moreover, the base station 110 may configure one or more CSI-RSs for the UE 120 in a second frequency band different from the first frequency band (e.g., the active DL BWP) and/or having a different SCS than the first frequency band. If the resource SCS of the CSI-RS differs from the SCS of the active DL BWP, or if the center frequency of the CSI-RS differs from the center frequency for the active DL BWP, the UE 120 will tune away from the first frequency band (e.g., the active DL BWP) for a certain time period while tuning into the second frequency band to receive the CSI-RS. This time period during which the UE 120 is tuned away from the PDSCH and/or the active DL BWP is referred to as a "measurement gap." Utilizing a measurement gap to monitor a CSI-RS results in additional operations performed by the UE 120, which requires additional power consumption and time and frequency resources consumption. Moreover, a measurement gap may be semi-statically scheduled, resulting in an inflexible operation because the UE 120 must cease receiving transmissions in the active DL BWP to tune into another frequency and receive the CSI-RS at the scheduled measurement gaps.

Some techniques and apparatuses described herein enable flexible monitoring of a reference signal to quickly and flexibly measure the strength of a neighboring cell's signal for purposes of determining the neighboring cell's interference or the like. More particularly, in some aspects the UE 120 performs an RSSI measurement within an active DL BWP of the UE 120 based at least in part on a measurement resource (e.g., an L3 measurement resource or similar), even when the SCS of the measurement resource is not the same as the SCS of the active DL BWP and/or when the center frequency of the measurement resource is not the same as the center frequency of the active DL BWP. Because the RSSI measurement does not require coherent demodulation, the UE 120 may perform the RSSI measurement in the active DL BWP without utilizing a measurement gap and/or without the UE 120 otherwise tuning away from the active DL BWP to monitor the reference signal. In this regard, the techniques and apparatuses described herein result in flexible reference signal monitoring, because the time resources for measuring the RSSI may be dynamically scheduled for periods when the UE 120 is not otherwise transmitting or receiving data rather than requiring that the UE 120 monitor the signals in a semi-statically scheduled measurement gap. Moreover, the techniques and apparatuses described herein result in reduced power consumption and reduced consumption of time and frequency resources, because the UE 120 is not required to tune to a different frequency band in a measurement gap to perform the RSSI measurement, but instead may perform the RSSI measurement in the active DL BWP.

As indicated above, FIG. 3 is provided as an example. Other examples may differ from what is described with regard to FIG. 3.

Figure 4:
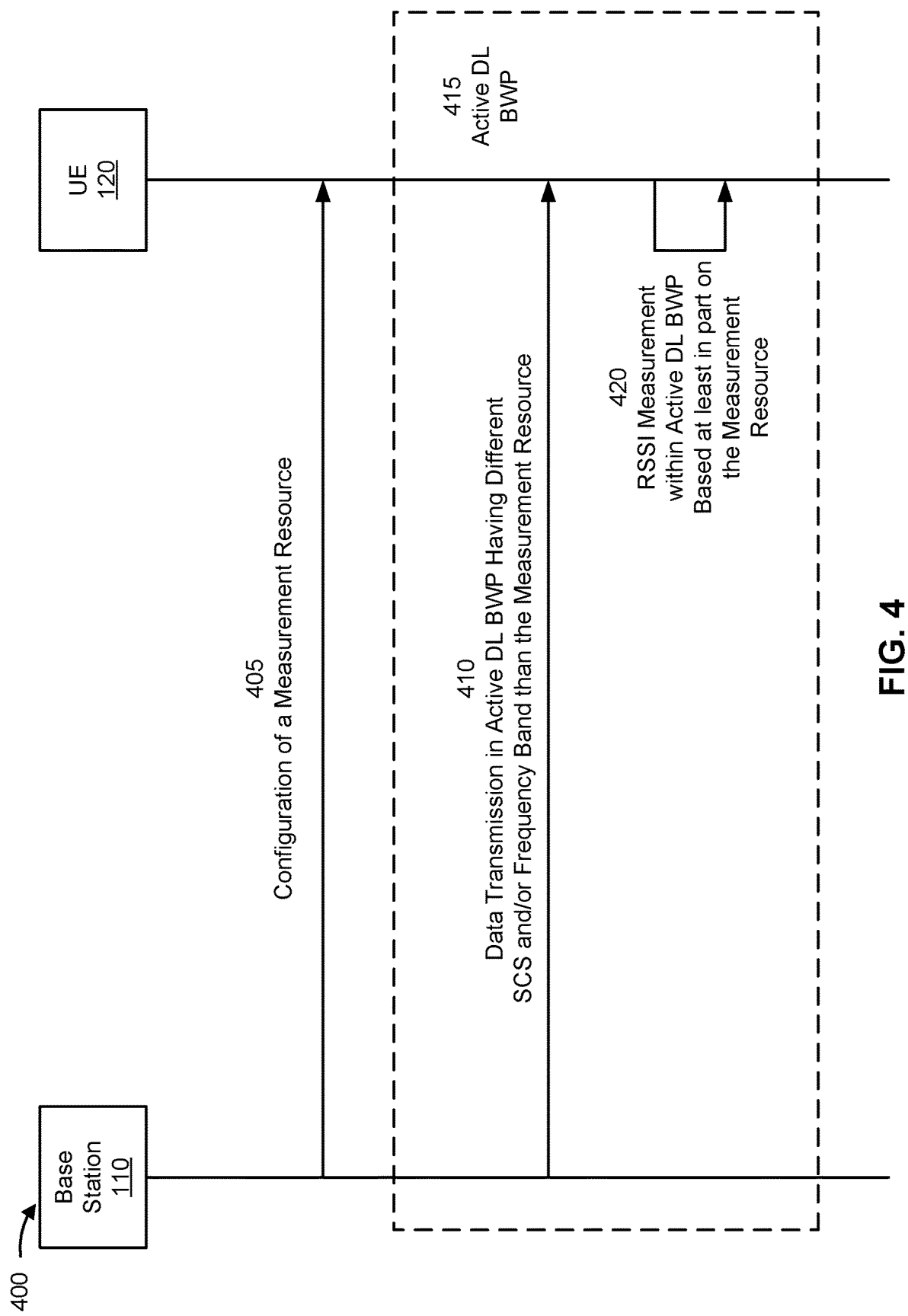
FIGS. 4-7 are diagrams illustrating examples associated with measuring a reference signal in an active downlink bandwidth part, in accordance with the present disclosure.

FIG. 4 is a diagram illustrating an example 400 associated with measuring a reference signal in an active DL BWP, in accordance with the present disclosure. As shown in FIG. 4, a base station 110 and a UE 120 may be in wireless communication with one another. In some aspects, the base station 110 and the UE 120 may be included in a wireless network, such as wireless network 100. The base station 110 and the UE 120 may communicate via a wireless access link, which may include an uplink and a downlink.

As shown by reference number 405, the base station 110 may transmit a configuration of a measurement resource to the UE 120. In some aspects, the measurement resource may be an L3 measurement resource, such as an L3 CSI-RS resource. In some other aspects, the measurement resource may be a specifically defined L3 RSSI resource, sometimes referred to as an L3 RSSI-specific measurement resource. The measurement resource may include frequency resources and time resources for measuring one or more signals. For example, the configuration of the measurement resource may indicate a frequency band centered about a measurement resource center frequency and an SCS associated with a signal measurement. Moreover, the configuration of the measurement resource may also indicate a time at which to perform the signal measurement.

In some aspects, the UE 120 may receive a data transmission or similar communication from the base station 110, as indicated by reference number 410. For example, the UE 120 may receive a transmission from the base station 110 in a PDCCH, a PDSCH, or a similar channel. The data transmission indicated at reference number 410 may be performed in a frequency band sometimes referred to as an active DL BWP, as indicated by reference number 415. The active DL BWP 415 may be centered about an active DL BWP center frequency and may be associated with an active DL BWP SCS. In some aspects, as generally indicated by reference number 410, the active DL BWP may have a different frequency band than the measurement resource (e.g., the frequency band for the active DL BWP may not completely contain the frequency band for the measurement resource and/or the active DL BWP center frequency may be different than the measurement resource center frequency) and/or the active DL BWP SCS may be different than the measurement resource SCS. As described above in connection with FIG. 3, this would traditionally require that the UE 120 perform the signal measurement in a measurement gap, during which the UE 120 tunes away from the active DL BWP 415 and tunes to the frequency band associated with the measurement resource.

However, according to aspects of the present disclosure, the UE 120 may perform a signal measurement, and more particularly an RSSI measurement, within the active DL BWP 415 based at least in part on the measurement resource, as indicated by reference number 420. That is, the UE 120 may perform the RSSI measurement within the active DL BWP 415 without utilizing a measurement gap, even if the measurement resource SCS differs from the active DL BWP SCS and/or even if the measurement resource frequency band differs from the active DL BWP 415. In some aspects, the measurement resource frequency band may differ from the active DL BWP 415 because at least a portion of the measurement resource frequency band does not overlap with (e.g., a least a portion of the measurement resource frequency band is not included within) the active DL BWP 415. Additionally, or alternatively, the measurement resource frequency band may differ from the active DL BWP 415 because a center frequency of the measurement resource frequency band differs from a center frequency of the active DL BWP 415. Measuring the RSSI within the active DL BWP 415 may be beneficial for measuring a signal strength of a neighboring cell for purposes of determining cell interference or the like. Because the RSSI measurement does not require coherent demodulation, as the RSSI only measures a power of the received signal, performing the RSSI measurement in a measurement gap is inefficient and unnecessary.

In aspects in which the measurement resource is an L3 CSI-RS resource, the UE 120 may beneficially utilize the predefined L3 CSI-RS resource but for a different purpose: rather than utilizing the L3 CSI-RS measurement resource for measuring an RSRP, an RSRQ, an SINR, or a similar parameter in a measurement gap for purposes of SSB-based RRM measurements for UE 120 mobility, the UE 120 may utilize the L3 CSI-RS measurement resource for measuring an RSSI in the active DL BWP 415 for purposes of determining a neighboring cell's interference or the like. Aspects of the disclosure are not so limited, however, and, in some other aspects, the measurement resource may be a measurement resource associated with a different layer (e.g., Layer 1 (L1 or physical layer), Layer 2 (L2), or the like), or the measurement resource may be a different L3 measurement resource such as an L3 measurement resource specifically configured for performing an RSSI measurement (e.g., an L3 RSSI-specific measurement resource).

As indicated above, FIG. 4 is provided as an example. Other examples may differ from what is described with respect to FIG. 4.

Figure 5:
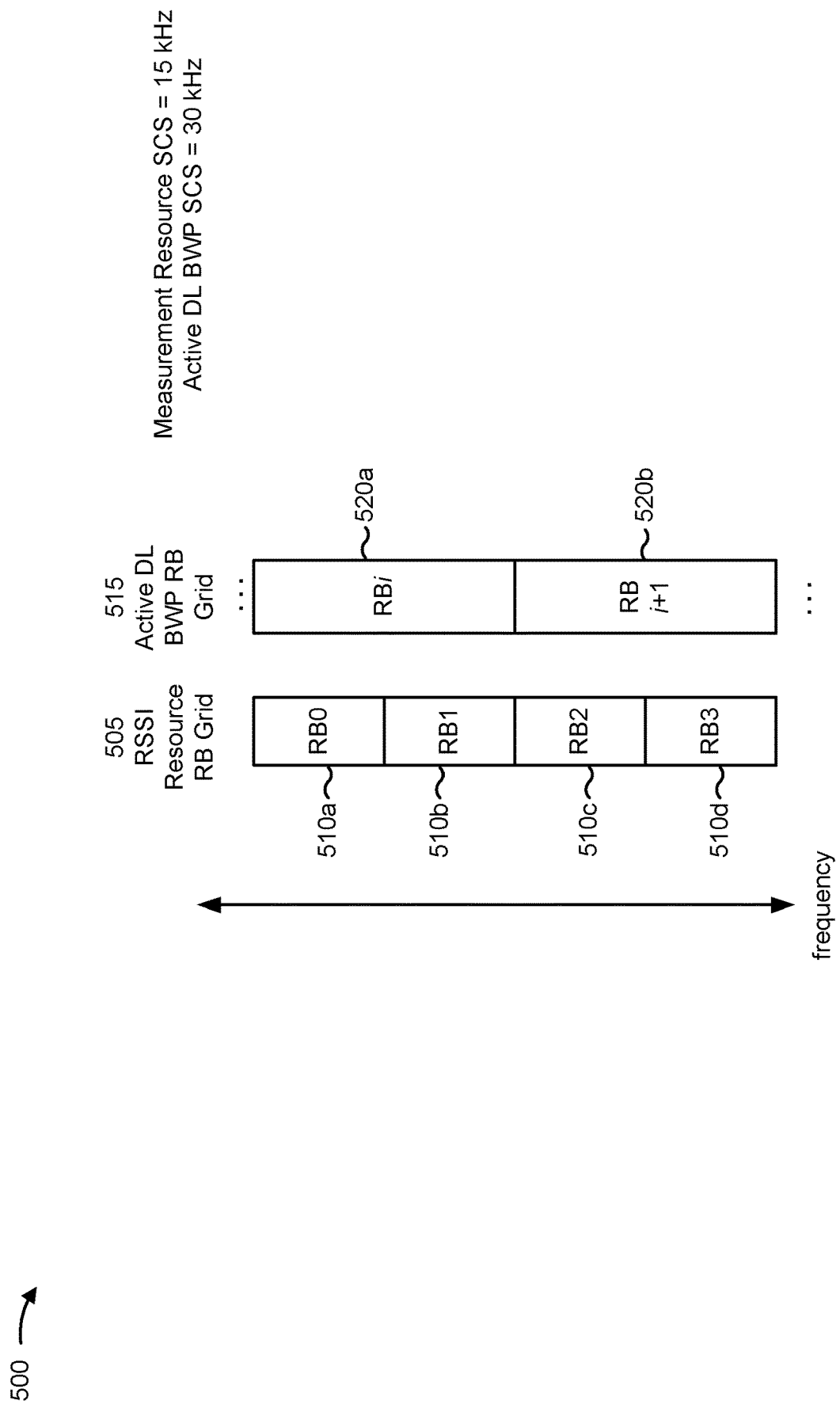

FIG. 5 is a diagram illustrating an example 500 associated with measuring a reference signal in an active DL BWP, in accordance with the present disclosure.

As indicated by reference number 505, the measurement resource may be associated with a resource block (RB) grid (sometimes referred to herein as an RSSI resource RB grid or a measurement resource RB grid). An RB is a contiguous set of frequency resources, and, more particularly, a contiguous set of 12 subcarriers. The configuration of the measurement resource provided by the base station 110 to the UE 120 (as shown at reference number 405 in FIG. 4) may include one or more RBs 510 for the UE 120 to perform a signal measurement, which is schematically depicted by the measurement resource RB grid 505. For ease of description, the measurement resource RB grid 505 is shown as including four RBs 510 (e.g., the RBs indexed as RB0 510a, RB1 510b, RB2 510c, and RB3 510d) for the UE 120 to perform the signal measurement, but in other aspects more or less RBs 510 may be provided without departing from the scope of the disclosure. Moreover, as indicated by reference number 515, the active DL BWP 415 may also be associated with an RB grid (sometimes referred to herein as an active DL BWP RB grid 515). The active DL BWP RB grid 515 may include one or more RBs 520 configured for the UE 120 to perform wireless communication with the base station 110, such as by receiving data transmissions or the like. For ease of description, the active DL BWP RB grid 515 is shown as having two RBs 520 (e.g., RBi 520a and RBi+1 520b), but in some other aspects, the active DL BWP RB grid 515 may include more or less RBs 520 without departing from the disclosure.

Again, in some aspects, the RSSI measurement may be performed within the active DL BWP 415 even if the SCS of the measurement resource differs from the SCS of the active DL BWP 415. For example, in some aspects, the SCS of the measurement resource may be smaller than the SCS of the active DL BWP 415, as is depicted in FIG. 5. There, the SCS of the measurement resource (e.g., 15 kHz) is half of the SCS of the active DL BWP 415 (e.g., 30 kHz). In such aspects, the bandwidth of each RB 510 of the measurement resource RB grid 505 may be 180 kHz (e.g., 12 subcarriers*15 kHz SCS), while the bandwidth of each RB 520 of the active DL BWP RB grid 515 may be 360 kHz (e.g., 12 subcarriers*30 kHz SCS). These values are provided only as examples, and, in some other aspects, different SCSs may be implemented without departing from the scope of the disclosure. For example, the SCS of the measurement resource and/or the SCS of the active DL BWP 415 may be any SCS associated with the corresponding RAT (e.g., 5G NR or the like), such as 15 kHz, 30 kHz, 60 kHz, 120 kHz, or 240 kHz. Returning to the example 500 depicted in FIG. 5, because the SCS of the measurement resource (e.g., 15 kHz) is smaller than the SCS of the active DL BWP 415 (e.g., 30 kHz), and more particularly because, in the depicted example, the SCS of the measurement resource is half that of the SCS of the active DL BWP 415, each RB 510 of the measurement resource RB grid 505 is half as wide, in a frequency dimension, as each RB 520 of the active DL BWP RB grid 515 (e.g., each RB 510 of the measurement resource RB grid 505 is half the bandwidth (e.g., 180 kHz) of each RB 520 of the active DL BWP RB grid 515 (e.g., 360 kHz)).

In some aspects, when the SCS of the measurement resource is smaller than the SCS of the active DL BWP 415, such as is depicted in FIG. 5, the UE 120 may receive a configuration, based at least in part on the SCS of the measurement resource, of a start RB index and a number of RBs associated with the RSSI measurement so that the RSSI measurement is not performed within partial RBs 520 in the active DL BWP 415. More particularly, in some aspects, the start RB index may be configured to be zero (e.g., corresponding to RB0 510a), two (e.g., corresponding to RB2 510c), or so forth, such that an upper edge (e.g., upper frequency bound) of the first RB of the RSSI measurement (e.g., RB0 510a or RB2 510c) aligns with an upper edge of an RB 520 (e.g., RBi 520a or RBi+1 520b, respectively) of the active DL BWP RB grid 515. This configuration avoids configuring the UE 120 to perform the RSSI measurement in a partial RB 520 of the active DL BWP RB grid 515. For example, if, instead, the start RB index was configured to be one (e.g., corresponding to RB1 510b), the upper frequency bounds of the first RB 510 (e.g., RB1 510a) would not align with the upper frequency bounds of an RB 520 of the active DL BWP RB grid 515. In such aspects, the UE 120 would perform an RSSI measurement in at least one partial RB 520 (e.g., the UE 120 would perform the RSSI measurement in only a portion of at least RBi 520a) of the active DL BWP RB grid 515, which the processing capabilities of the UE 120 may not be able to handle and/or which may be computationally difficult according the configuration and/or specific implementation for the UE 120.

Moreover, a number of consecutive RBs 510 of the measurement resource RB grid 505 for performing the RSSI measurement may be configured such that the RBs 510 of the grid 505 align with the RBs 520 of the active DL BWP RB grid 515, which, again, avoids the UE 120 performing an RSSI measurement in a partial RB 520 of the active DL BWP RB grid 515. More particularly, in the depicted example, the measurement resource RB grid 505 may be configured to include four consecutive RBs 510 (e.g., RB0 510a, RB1 510b, RB2 510c, and RB3 510d) for performing the RSSI measurement, such that the measurement resource aligns with two RBs 520 of the active DL BWP RB grid 515 (e.g., RBi 520a and RBi+1 520b). If, instead, the measurement resource RB grid 505 were configured to include, for example, three consecutive RBs 510 for performing the RSSI measurement, such as RB0 510a, RB1 510b, and RB2 510c, then the RSSI measurement would be performed in a partial RB 520 (e.g., RBi+1 520b) of the active DL BWP RB grid 515, even if the start RB 510 were configured to align with an RB 520 of the active DL BWP RB grid 515.

In some aspects, the start RB index and a number of consecutive RBs for performing the RSSI measurement may be configured such that each parameter is a multiple of a quotient of a first SCS associated with the active DL BWP 415 divided by a second SCS associated with the measurement resource. This may beneficially result in UE 120 avoiding performing the RSSI measurement in a partial RB 520 of the active DL BWP RB grid 515, as described. More particularly, the start RB index may be a first multiple of the quotient of the first SCS divided by the second SCS, and the number of consecutive RBs for performing the RSSI measurement may be a second multiple of the quotient of the first SCS divided by the second SCS. In the example depicted in FIG. 5, when the first multiple is zero, the start RB index will be zero (e.g., zero (e.g., the first multiple)*two (e.g., the first SCS divided by the second SCS)), resulting in RB0 510*a* being the start RB, which aligns with RBi 520*a* of the active DL BWP 415. Similarly, when the first multiple is one, the start RB index is two (e.g., one (e.g., the first multiple)*two (e.g., the first SCS divided by the second SCS)), resulting in RB2 510*c* being the start RB, which aligns with RBi+1 520*b* of the active DL BWP 415.

Moreover, when the second multiple is one, the number of consecutive RBs for performing the RSSI measurement is two (e.g., one (e.g., the second multiple)*two (e.g., the first SCS divided by the second SCS)), resulting the UE 120 using RB0 510*a* and RB1 510*b*, which span one RB 520 (e.g., RBi 520*a*) in the active DL BWP 415, for the RSSI measurement. Similarly, when the second multiple is two, the number of consecutive RBs for performing the RSSI measurement is four (e.g., two (e.g., the second multiple) *two (e.g., the first SCS divided by the second SCS)), resulting the UE 120 using RB0 510*a*, RB1 510*b*, RB2 510*c*, and RB3 510*d*, which span two RBs 520 (e.g., RBi 520*a* and RBi+1 520*b*) in the active DL BWP 415, for performing the RSSI measurement.

These multiples are provided merely as examples, and, in some other aspects, other multiples may be employed without departing from the scope of the disclosure. Moreover, in aspects in which the zero-indexed RB (or any other RB) of the measurement resource RB grid 505 (e.g., RB0 510*a*) is not within the active DL BWP 415 (e.g., when the measurement resource bandwidth and the active DL BWP 415 do not completely overlap), the first multiple may be configured as one, two, or the like, such that the start RB is within the active DL BWP. Put another way, if one or both of the first two RBs 510 (e.g., RB0 510*a* and RB1 510*b*) of the measurement resource were not within the active DL BWP 415, then the first multiple may be configured as one or higher so that the UE 120 would perform the RSSI measurement within the active DL BWP 415 (e.g., so that the start RB would be RB2 510*c* or higher). Moreover, in some other aspects, the first multiple may be configured to be the same as the second multiple without departing from the scope of the disclosure.

As indicated above, FIG. 5 is provided as an example. Other examples may differ from what is described with respect to FIG. 5.

Figure 6:
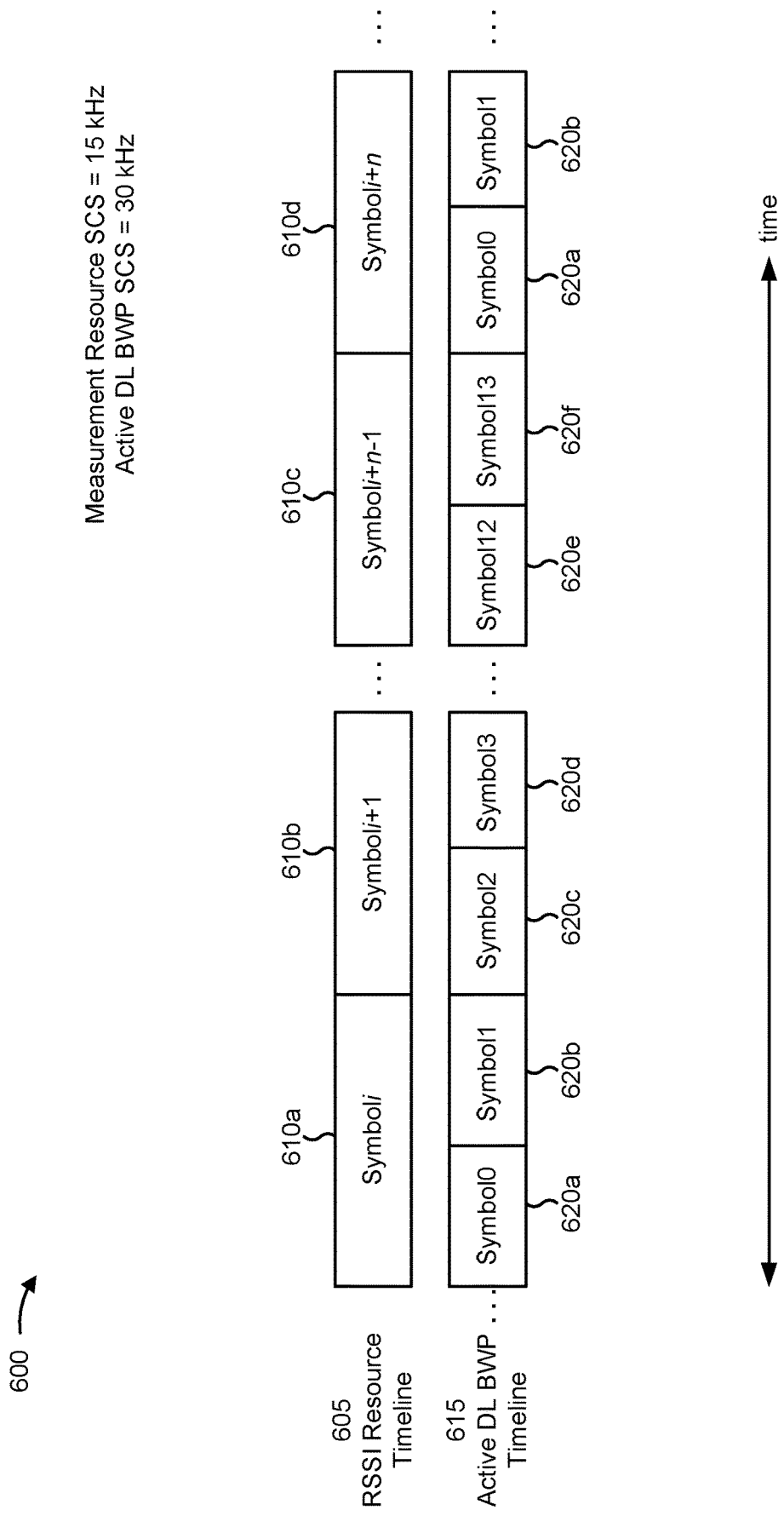

FIG. 6 is a diagram illustrating an example 600 associated with measuring a reference signal in an active DL BWP, in accordance with the present disclosure.

As indicated by reference number 605, the measurement resource may be associated with a timeline (sometimes referred to herein as a measurement resource timeline or as an RSSI resource timeline), which includes a contiguous number of symbols 610 for performing a signal measurement. Four symbols 610 (e.g., symboli 610*a*, symboli+1 610*b*, symboli+n−1 610*c*, and symboli+n 610*d*) of the measurement resource timeline 605 are shown in FIG. 6 for purposes of the description. Moreover, as indicated by reference number 615, the active DL BWP 415 may also be associated with a timeline (sometimes referred to as an active DL BWP timeline) having a number of symbols 620 for performing wireless communication between the UE 120 and the base station 110. Six different active DL BWP symbols 620 (e.g., symbol0 620*a*, symbol1 620*b*, symbol2 620*c*, symbol3 620*d*, symbol12 620*e*, and symbol13 620*f*) of the active DL BWP timeline 615 are shown in FIG. 6 for purposes of the description.

Again, the SCS of the active DL BWP 415 may differ from the SCS of the measurement resource, and thus the symbol length of the symbols 620 of the active DL BWP timeline 615 may differ from the symbol length of the symbols 610 of the measurement resource timeline 605. More particularly, in the depicted example, the SCS of the measurement resource (e.g., 15 kHz) is again half of the SCS of the active DL BWP 415 (e.g., 30 kHz). Thus, according to numerology principles associated with wireless communication, the symbol length of the symbols 610 of the measurement resource timeline 605 will be twice as long as the symbol length of the symbols 620 of the active DL BWP timeline 615. In such aspects, the UE 120 may be configured to perform the RSSI measurement in a number of consecutive symbols 620 in the active DL BWP 415 for each symbol 610 of the measurement resource so that the RSSI measurement is not performed in a partial symbol of the measurement resource timeline 605.

More particularly, the UE 120 may be configured to perform the RSSI measurement in N consecutive symbols 620 in the active DL BWP for each symbol 610 of the configured measurement resource, wherein N is equal to the quotient of the first SCS associated with the active DL BWP 415 divided by the second SCS associated with the measurement resource. In the depicted example, the quotient of the first SCS associated with the active DL BWP 415 divided by the second SCS associated with the measurement resource is equal to two (e.g., 30 kHz/15 kHz), and thus the UE 120 may be configured to perform the RSSI measurement in two consecutive active DL BWP symbols 620 for each symbol 610 of the configured measurement resource so as to avoid performing the RSSI measurement in a partial symbol 610 of the measurement resource timeline 605. For example, if the measurement resource included two symbols 610 (e.g., symboli 610*a* and symboli+1 610*b*), the UE 120 would be configured to perform the RSSI measurement in four consecutive symbols 620 (e.g., symbol0 620*a*, symbol1 620*b*, symbol2 620*c*, and symbol3 620*d*) in the active DL BWP 415.

In some aspects, the UE 120 processing timeline for performing the RSSI measurement may be based at least in part on a slot boundary. Accordingly, in some aspects, the UE 120 may be configured such that the UE 120 does not perform the RSSI measurement across a slot boundary in the active DL BWP 415. More particularly, the UE 120 may receive a configuration, based at least in part on the SCS of the measurement resource, of a start symbol index and a number of consecutive symbols to perform the RSSI measurement such that the RSSI measurement is not performed across a slot boundary in the active DL BWP 415. For example, symboli+n−1 610*c* and symboli+n 610*d* of the measurement resource timeline 605 collectively span a slot boundary in the active DL BWP timeline 615, with the first symbol thereof (e.g., symboli+n−1 610*c*) aligning with two symbols 620 provided in a first slot (e.g., symbol12 620*e* and symbol13 620*f*), and with the second symbol 610 thereof (e.g., symboli+n 610*d*) aligning with two symbols 620 provided in a second slot (e.g., the second occurrences of symbol0 620*a* and symbol1 620*b*). Thus, if the UE 120 were configured to perform an RSSI measurement symboli+n−1 610*c* and symboli+n 610*d*, the RSSI measurement would span a slot boundary, which the processing capabilities of the UE 120 may not be able to handle and/or which may be computationally difficult according the configuration and/or specific implementation for the UE 120.

Accordingly, in some aspects, the UE 120 may receive a configuration (e.g., the UE 120 may receive a start symbol index and a number of consecutive symbols for performing the RSSI measurement) such that the RSSI measurement does not span the slot boundary. More particularly, the UE 120 may receive a configuration to begin measuring the RSSI at symboli 610*a*, and to continue the RSSI measurement for two consecutive symbols (e.g., to perform the RSSI measurement during the time period spanning symbols 610*a*-610*b*), to avoid performing the RSSI measurement across a slot boundary in the active DL BWP timeline 615.

As indicated above, FIG. 6 is provided as an example. Other examples may differ from what is described with respect to FIG. 6.

Figure 7:
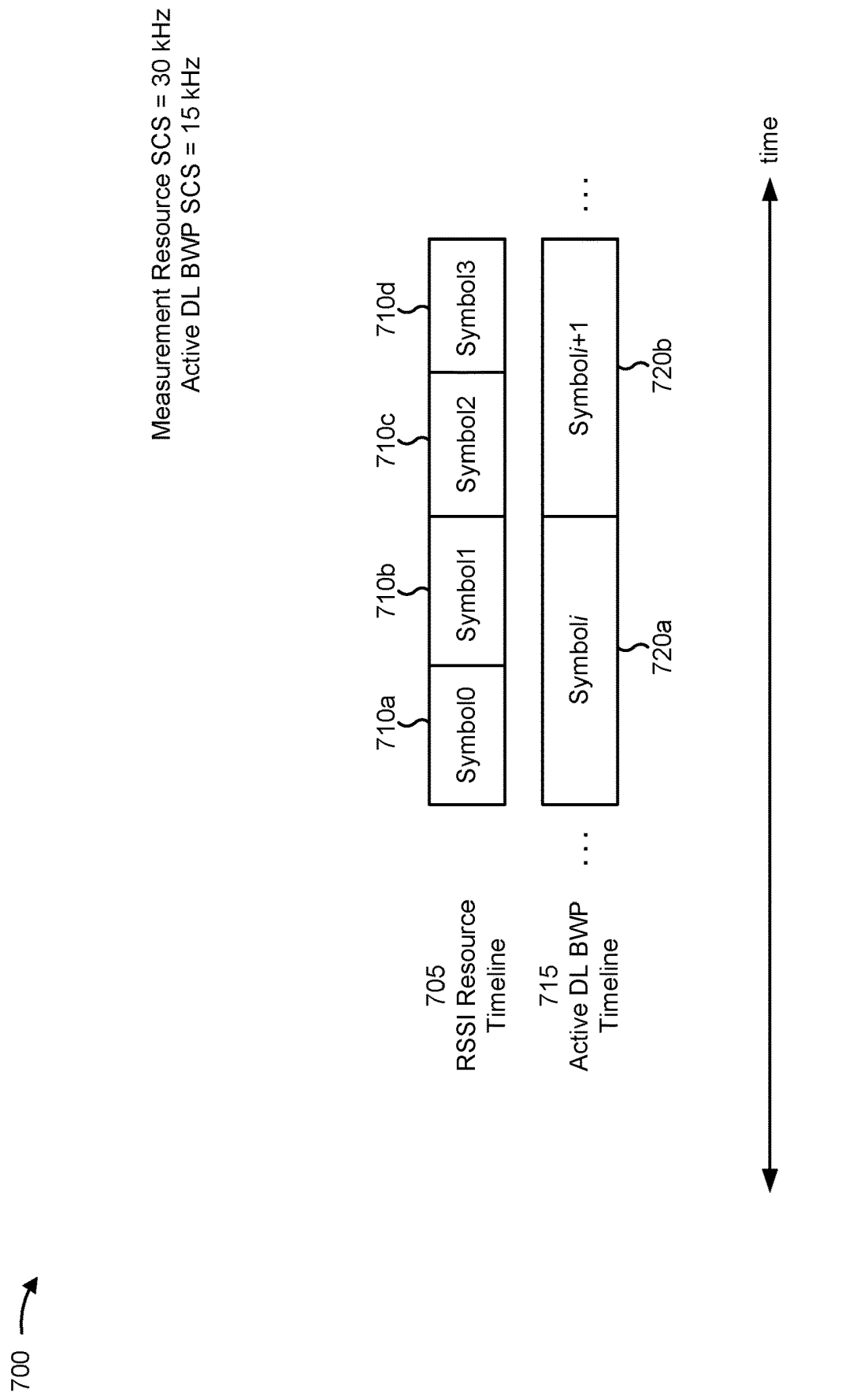

FIG. 7 is a diagram illustrating an example 700 associated with measuring a reference signal in an active DL BWP, in accordance with the present disclosure.

In some aspects, such as in the example shown in FIG. 7, the second SCS associated with the measurement resource may be larger than the first SCS associated with the active DL BWP 415. Accordingly, the UE 120 may be configured such that the UE 120 does not perform the RSSI measurement in a partial symbol of the active DL BWP 415. For example, as indicated by reference number 705, the measurement resource may be associated with a timeline (again, sometimes referred to herein as a measurement resource timeline or an RSSI resource timeline), which includes a number of contiguous symbols 710 for performing a signal measurement. Four symbols 710 (e.g., symbol0 710*a*, symbol1 710*b*, symbol2 710*c*, and symbol3 710*d*) of the measurement resource timeline 705 are shown in FIG. 7 for purposes of the description. Moreover, as indicated by reference number 715, the active DL BWP 415 may be associated with a timeline (again, sometimes referred to herein as an active DL BWP timeline), which includes a number of symbols 720 for performing wireless communication between the UE 120 and the base station 110. Two active DL BWP symbols 720 (e.g., symboli 720*a* and symboli+1 720*b*) of the active DL BWP timeline 715 are shown for purposes of the description.

In this example, the second SCS associated with the measurement resource (e.g., 30 kHz) is twice as large as the first SCS associated with the active DL BWP 415 (e.g., 15 kHz), and thus, according to principles of numerology, the length (e.g., the time period) of each symbol 710 of the measurement resource timeline 705 is half as long as the length of each symbol 720 of the active DL BWP timeline 715. In such aspects, the start symbol index and the number of consecutive symbols associated with the RSSI measurement may each be configured to be a multiple of a quotient of the second SCS associated with measurement resource divided by the first SCS associated with the active DL BWP 415, such that the UE 120 does not perform the RSSI measurement in a partial symbol 720 of the active DL BWP timeline 715. More particularly, the start symbol index may be a first multiple of a quotient of the SCS of the measurement resource divided by the SCS of the active DL BWP 415, and the number of consecutive symbols for performing the RSSI measurement may be a second multiple of the quotient of the SCS of the measurement resource divided by the SCS of the active DL BWP 415.

For example, and as shown in FIG. 7, the measurement resource SCS may be 30 kHz, while the active DL BWP SCS may be 15 kHz. Thus, the quotient of the second SCS associated with the measurement resource divided by the first SCS associated with the active DL BWP 415 would be two (e.g., 30 kHz/15 kHz). In such aspects, if the first multiple is zero, the start symbol index would be configured to be zero (e.g., zero (e.g., the first multiple)*two (e.g., the second SCS divided by the first SCS)), and the RSSI measurement would commence at symbol0 710*a*. If the first multiple is one, the start symbol index would be configured to be two (e.g., one (e.g., the first multiple)*two (e.g., the second SCS divided by the first SCS)), and the RSSI measurement would commence at symbol2 710*c*, and so forth. In this regard, the RSSI measurement would begin at the start of a corresponding symbol 720 in the active DL BWP timeline 715 (e.g., symboli 720*a* and symboli+1 720*b*, respectively), thus avoiding an RSSI measurement in a partial symbol of the active DL BWP timeline 715.

Similarly, if the second multiple is one, the number of consecutive symbols for performing the RSSI measurement would be configured to be two (e.g., one (e.g., the second multiple)*two (e.g., the second SCS divided by the first SCS)), and the RSSI measurement would be performed during symbol0 710*a* and symbol1 710*b* (assuming the start symbol index were configured to be zero). If the second multiple is two, the number of consecutive symbols for performing the RSSI measurement would be configured to be four (e.g., two (e.g., the second multiple)*two (e.g., the second SCS divided by the first SCS)), and the RSSI measurement would be performed during symbol0 710*a*, symbol1 710*b*, symbol2 710*c*, and symbol 710*d* (again, assuming the start symbol index were configured to be zero), and so forth. In this regard, the RSSI measurement would span corresponding symbols 720 in the active DL BWP timeline 715 (e.g., symboli 720*a* and symboli+1 720*b*, respectively), thus avoiding an RSSI measurement in a partial symbol of the active DL BWP timeline 715.

If, instead, the start symbol index and/or the number of consecutive symbols for performing the RSSI measurement were not configured as a multiple of the quotient of the second SCS associated with the measurement resource divided by the first SCS associated with the active DL BWP 415, as described above, the RSSI measurement may undesirably be performed in partial symbols of the active DL BWP timeline 715. For example, if the start symbol index were configured as one (corresponding to symbol1 710*a*), which is not a multiple of two (corresponding to the quotient of the SCS of the measurement resource divided by the SCS of the active DL BWP 415), the RSSI measurement would be performed in at least one partial symbol 720 (e.g., symboli 720*a*) of the active DL BWP timeline 715. Similarly, if the number of consecutive symbols for performing the RSSI measurement were configured to be three (corresponding to symbol0 710*a*, symbol1 710*b*, and symbol2 710*c*, assuming the start symbol index were configured to be zero), which is not a multiple of two (corresponding to the quotient of the SCS of the measurement resource divided by the SCS of the active DL BWP 415), the RSSI measurement would be performed in at least one partial symbol 720 (e.g., symboli+1 720*b*) of the active DL BWP timeline 715. Thus, by configuring the start symbol index and the number of consecutive symbols for performing the RSSI measurement based at least in part on the SCS of the measurement resource, and, more particularly, by configuring the start symbol index and the number of consecutive symbols for performing the RSSI measurement as a multiple of the quotient of the SCS of the measurement resource divided by the SCS of the active DL BWP 415 (when the SCS of the measurement resource is larger than the SCS of the active DL BWP 415), the UE 120 will avoid performing the RSSI measurement in partial symbols of the active DL BWP timeline 715, which the processing capabilities of the UE 120 may not be able to handle and/or which may be computationally difficult according the configuration and/or specific implementation for the UE 120.

As indicated above, FIG. 7 is provided as an example. Other examples may differ from what is described with respect to FIG. 7.

Figure 8:
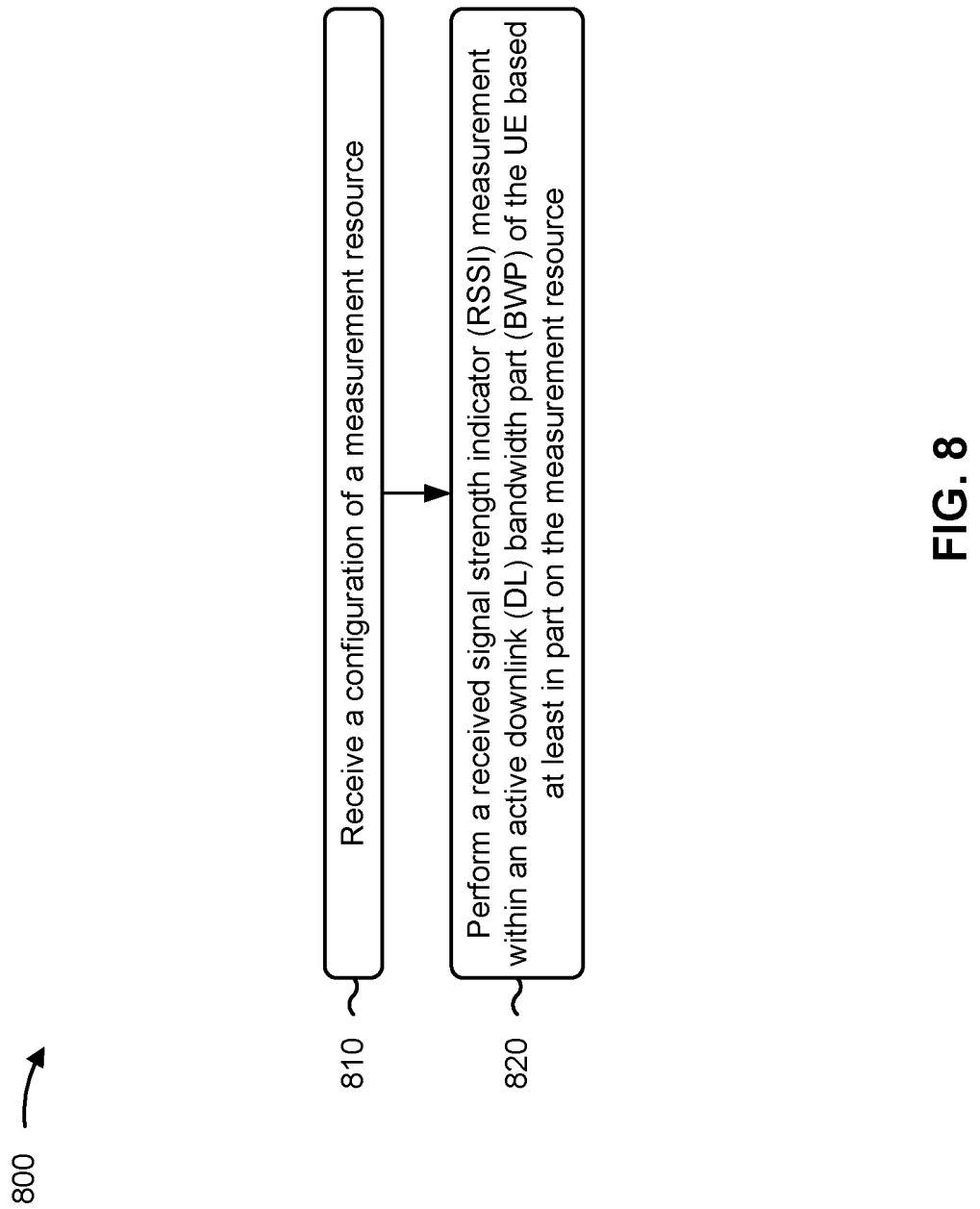
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with a measurement resource for measuring an RSSI.

As shown in FIG. 8, in some aspects, process 800 may include receiving a configuration of a measurement resource (block 810). For example, the UE (e.g., using communication manager 140 and/or reception component 1002, depicted in FIG. 10) may receive a configuration of a measurement resource, as described above.

As further shown in FIG. 8, in some aspects, process 800 may include performing an RSSI measurement within an active DL BWP of the UE based at least in part on the measurement resource (block 820). For example, the UE (e.g., using communication manager 140 and/or measurement component 1008, depicted in FIG. 10) may perform an RSSI measurement within an active DL BWP of the UE based at least in part on the measurement resource, as described above.

Process 800 may include additional aspects, such as any single aspect or any combination of aspects described below and/or in connection with one or more other processes described elsewhere herein.

In a first aspect, the measurement resource is an L3 measurement resource.

In a second aspect, alone or in combination with the first aspect, the L3 measurement resource is one of a CSI-RS measurement resource or an L3 RSSI-specific measurement resource.

In a third aspect, alone or in combination with the one or more of the first through second aspects, the configuration of the measurement resource is received via a transceiver coupled to one or more processors.

In a fourth aspect, alone or in combination with one or more of the first through third aspects, the measurement resource includes frequency resources, and at least a portion of the frequency resources does not overlap the active DL BWP.

In a fifth aspect, alone or in combination with one or more of the first through fourth aspects, the active DL BWP is associated with a first SCS, the measurement resource is associated with a second SCS different from the first SCS, and the RSSI measurement is performed without utilizing a measurement gap.

In a sixth aspect, alone or in combination with one or more of the first through fifth aspects, the second SCS is smaller than the first SCS.

In a seventh aspect, alone or in combination with one or more of the first through sixth aspects, the measurement resource includes a first number of symbols, the RSSI measurement is performed during a second number of symbols in the active DL BWP, and the second number of symbols is equal to the first number of symbols multiplied by a quotient of the first SCS divided by the second SCS.

In an eighth aspect, alone or in combination with one or more of the first through seventh aspects, the process 800 may further include, based at least in part on the second SCS, receiving a configuration of a start RB index and a number of RBs associated with the RSSI measurement.

In a ninth aspect, alone or in combination with one or more of the first through eighth aspects, the start RB index is a first multiple of a quotient of the first SCS divided by the second SCS, and the number of RBs is a second multiple of the quotient of the first SCS divided by the second SCS.

In a tenth aspect, alone or in combination with one or more of the first through ninth aspects, the process 800 may further include, based at least in part on the second SCS, receiving a configuration of a start symbol index and a number of symbols associated with the RSSI measurement.

In an eleventh aspect, alone or in combination with one or more of the first through tenth aspects, the start symbol index is configured such that the RSSI measurement is contained within a slot based on the first SCS of the active DL BWP.

In a twelfth aspect, alone or in combination with one or more of the first through eleventh aspects, the second SCS is larger than the first SCS.

In a thirteenth aspect, alone or in combination with one or more of the first through twelfth aspects, the process 800 may further include, based at least in part on the second SCS, receiving a configuration of a start symbol index and a number of symbols associated with the RSSI measurement.

In a fourteenth aspect, alone or in combination with one or more of the first through thirteenth aspects, the start symbol index is a first multiple of a quotient of the second SCS divided by the first SCS, and the number of symbols is a second multiple of the quotient of the second SCS divided by the first SCS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
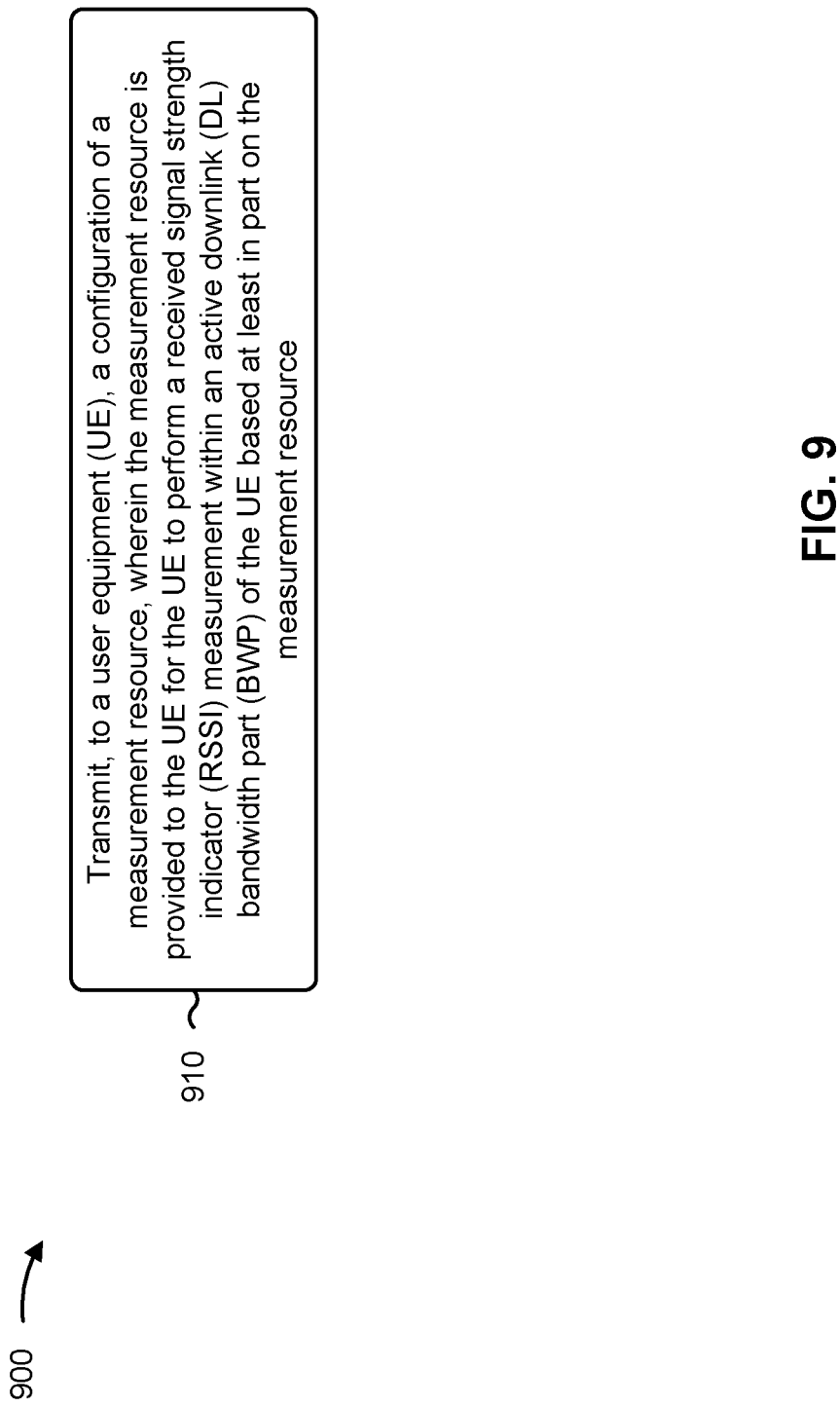
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110) performs operations associated with configuring a measurement resource for measuring an RSSI.

As shown in FIG. 9, in some aspects, process 900 may include transmitting, to a UE, a configuration of a measurement resource, wherein the measurement resource is provided to the UE for the UE to perform an RSSI measurement within an active DL BWP of the UE based at least in part on the measurement resource (block 910). For example, the base station (e.g., using communication manager 150, transmission component 1104, depicted in FIG. 11, and/or configuration component 1108, depicted in FIG. 11) may transmit, to a UE, a configuration of a measurement resource, wherein the measurement resource is provided to the UE for the UE to perform an RSSI measurement within an active DL BWP of the UE based at least in part on the measurement resource, as described above. In some aspects, the measurement resource is provided to the UE for the UE to perform an RSSI measurement within an active DL BWP of the UE based at least in part on the measurement resource.

Process 900 may include additional aspects, such as any single aspect or any combination of aspects described below and/or in connection with one or more other processes described elsewhere herein.

In a first aspect, the measurement resource is an L3 measurement resource.

In a second aspect, alone or in combination with the first aspect, the L3 measurement resource is a CSI-RS measurement resource.

In a third aspect, alone or in combination with one or more of the first and second aspects, the L3 measurement resource is an L3 RSSI-specific measurement resource.

In a fourth aspect, alone or in combination with one or more of the first through third aspects, the measurement resource includes frequency resources, and at least a portion of the frequency resources does not overlap the active DL BWP.

In a fifth aspect, alone or in combination with one or more of the first through fourth aspects, the active DL BWP is associated with a first SCS, the measurement resource is associated with a second SCS different from the first SCS, and the RSSI measurement is performed without utilizing a measurement gap.

In a sixth aspect, alone or in combination with one or more of the first through fifth aspects, the second SCS is smaller than the first SCS.

In a seventh aspect, alone or in combination with one or more of the first through sixth aspects, the measurement resource includes a first number of symbols, the RSSI measurement is performed during a second number of symbols in the active DL BWP, and the second number of symbols is equal to the first number of symbols multiplied by a quotient of the first SCS divided by the second SCS.

In an eighth aspect, alone or in combination with one or more of the first through seventh aspects, the process 900 further includes, based at least in part on the second SCS, transmitting a configuration of a start RB index and a number of RBs associated with the RSSI measurement.

In a ninth aspect, alone or in combination with one or more of the first through eighth aspects, the start RB index is a first multiple of a quotient of the first SCS divided by the second SCS, and the number of RBs is a second multiple of the quotient of the first SCS divided by the second SCS.

In a tenth aspect, alone or in combination with one or more of the first through ninth aspects, the process 900 further includes, based at least in part on the second SCS, transmitting a configuration of a start symbol index and a number of symbols associated with the RSSI measurement.

In an eleventh aspect, alone or in combination with one or more of the first through tenth aspects, the start symbol index is configured such that the RSSI measurement is contained within a slot of the active DL BWP.

In a twelfth aspect, alone or in combination with one or more of the first through eleventh aspects, the second SCS is larger than the first SCS.

In a thirteenth aspect, alone or in combination with one or more of the first through twelfth aspects, the process 900 further includes, based at least in part on the second SCS, transmitting a configuration of a start symbol index and a number of symbols associated with the RSSI measurement.

In a fourteenth aspect, alone or in combination with one or more of the first through thirteenth aspects, the start symbol index is a first multiple of a quotient of the second SCS divided by the first SCS, and the number of symbols is a second multiple of the quotient of the second SCS divided by the first SCS.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
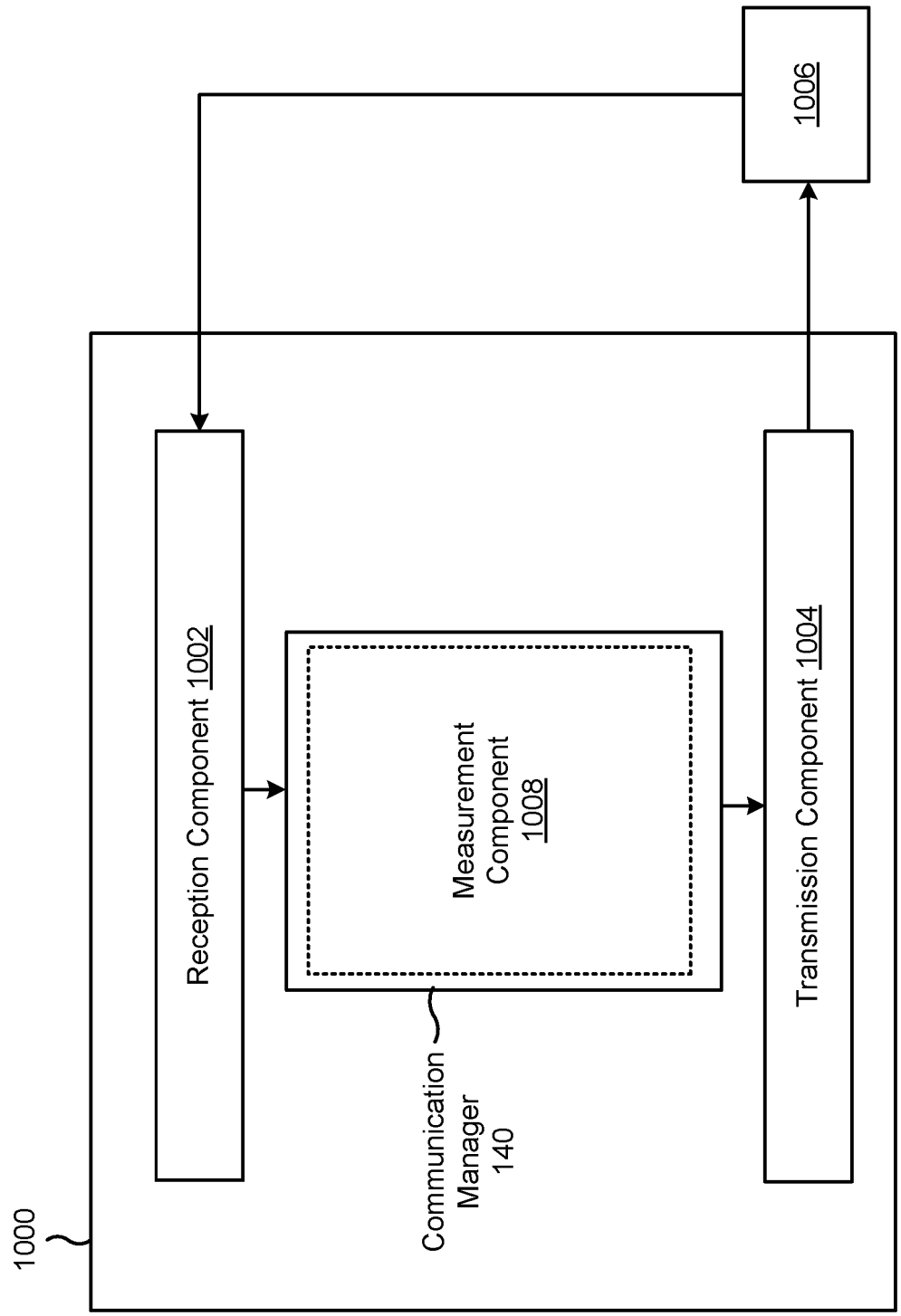
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a measurement component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a configuration of a measurement resource. The measurement component 1008 may perform an RSSI measurement within an active DL BWP of the UE based at least in part on the measurement resource.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
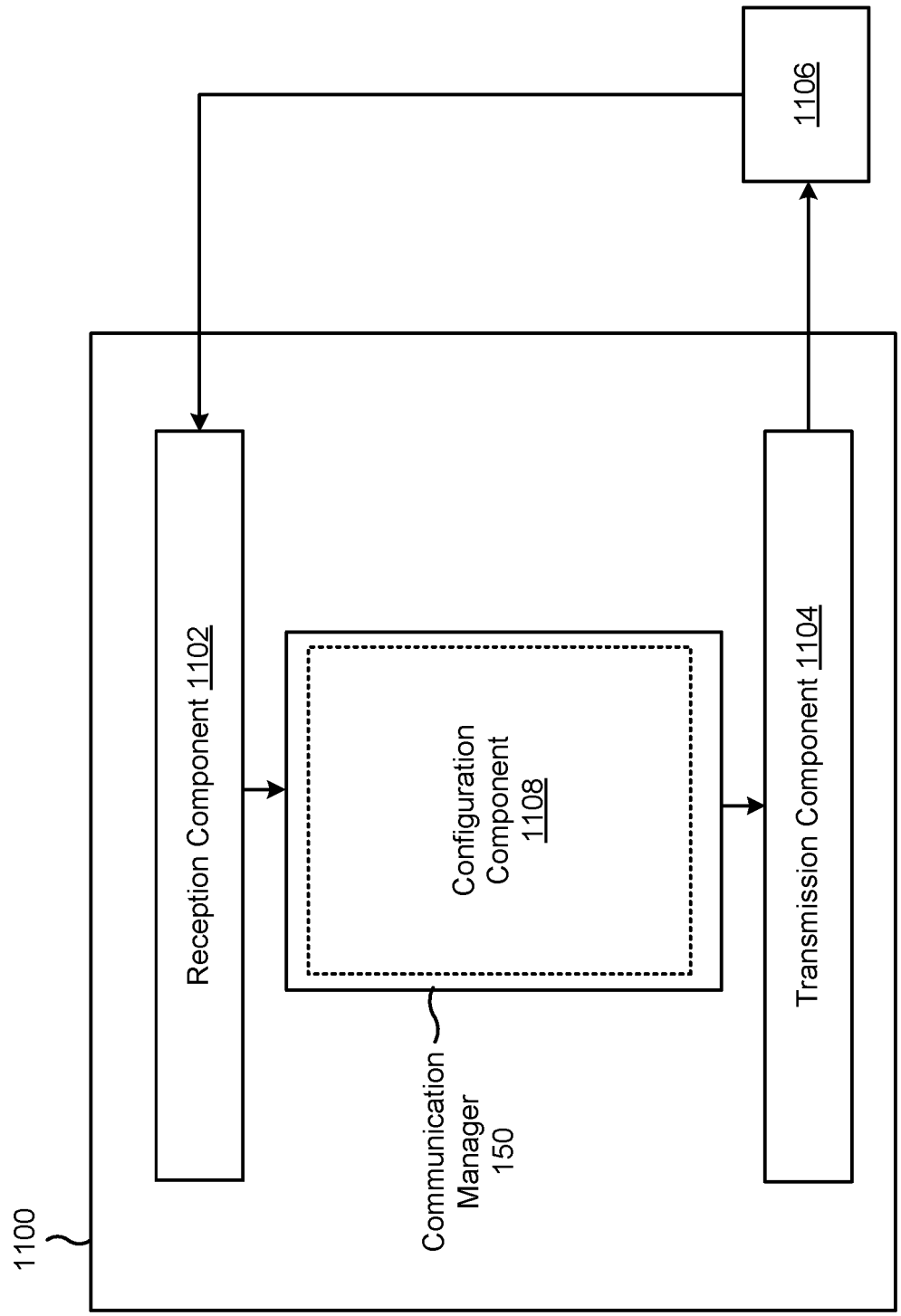
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 and/or the configuration component may transmit, to a UE, a configuration of a measurement resource wherein the measurement resource is provided to the UE for the UE to perform an RSSI measurement within an active DL BWP of the UE based at least in part on the measurement resource.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving a configuration of a measurement resource; and performing an RSSI measurement within an active DL BWP of the UE based at least in part on the measurement resource.

Aspect 2: The method of Aspect 1, wherein the measurement resource is an L3 measurement resource.

Aspect 3: The method of Aspect 2, wherein the L3 measurement resource is one of a CSI-RS measurement resource or an L3 RSSI-specific measurement resource.

Aspect 4: The method of any of Aspects 1-3, wherein the configuration of the measurement resource is received via a transceiver coupled to one or more processors.

Aspect 5: The method of any of Aspects 1-4, wherein the measurement resource includes frequency resources, and wherein at least a portion of the frequency resources does not overlap the active DL BWP.

Aspect 6: The method of any of Aspects 1-5, wherein the active DL BWP is associated with a SCS, wherein the measurement resource is associated with a second SCS different from the first SCS, and wherein the RSSI measurement is performed without utilizing a measurement gap.

Aspect 7: The method of Aspect 6, wherein the second SCS is smaller than the first SCS.

Aspect 8: The method of Aspect 7, wherein the measurement resource includes a first number of symbols, wherein the RSSI measurement is performed during a second number of symbols in the active DL BWP, and wherein the second number of symbols is equal to the first number of symbols multiplied by a quotient of the first SCS divided by the second SCS.

Aspect 9: The method of Aspect 7, further comprising, based at least in part on the second SCS, receiving a configuration of a start RB index and a number of RBs associated with the RSSI measurement.

Aspect 10: The method of Aspect 9, wherein the start RB index is a first multiple of a quotient of the first SCS divided by the second SCS, and wherein the number of RBs is a second multiple of the quotient of the first SCS divided by the second SCS.

Aspect 11: The method of Aspect 7, further comprising, based at least in part on the second SCS, receiving a configuration of a start symbol index and a number of symbols associated with the RSSI measurement.

Aspect 12: The method of Aspect 11, wherein the start symbol index is configured such that the RSSI measurement is contained within a slot based on the first SCS of the active DL BWP.

Aspect 13: The method of Aspect 6, wherein the second SCS is larger than the first SCS.

Aspect 14: The method of Aspect 13, further comprising, based at least in part on the second SCS, receiving a configuration of a start symbol index and a number of symbols associated with the RSSI measurement.

Aspect 15: The method of Aspect 14, wherein the start symbol index is a first multiple of a quotient of the second SCS divided by the first SCS, and wherein the number of symbols is a second multiple of the quotient of the second SCS divided by the first SCS.

Aspect 16: A method of wireless communication performed by a base station, comprising: transmitting, to a UE, a configuration of a measurement resource, wherein the measurement resource is provided to the UE for the UE to perform an RSSI measurement within an active DL BWP of the UE based at least in part on the measurement resource.

Aspect 17: The method of Aspect 16, wherein the measurement resource is an L3 measurement resource.

Aspect 18: The method of Aspect 17, wherein the L3 measurement resource is a CSI-RS measurement resource.

Aspect 19: The method of Aspect 17, wherein the L3 measurement resource is an L3 RSSI-specific measurement resource.

Aspect 20: The method of any of Aspects 16-19, wherein the measurement resource includes frequency resources, and wherein at least a portion of the frequency resources does not overlap the active DL BWP.

Aspect 21: The method of any of Aspects 16-20, wherein the active DL BWP is associated with a first SCS, wherein the measurement resource is associated with a second SCS different from the first SCS, and wherein the RSSI measurement is performed without utilizing a measurement gap.

Aspect 22: The method of Aspect 21, wherein the second SCS is smaller than the first SCS.

Aspect 23: The method of Aspect 22, wherein the measurement resource includes a first number of symbols, wherein the RSSI measurement is performed during a second number of symbols in the active DL BWP, and wherein the second number of symbols is equal to the first number of symbols multiplied by a quotient of the first SCS divided by the second SCS.

Aspect 24: The method of Aspect 22, further comprising, based at least in part on the second SCS, transmitting a configuration of a start RB index and a number of RBs associated with the RSSI measurement.

Aspect 25: The method of Aspect 24, wherein the start RB index is a first multiple of a quotient of the first SCS divided by the second SCS, and wherein the number of RBs is a second multiple of the quotient of the first SCS divided by the second SCS.

Aspect 26: The method of Aspect 22, further comprising, based at least in part on the second SCS, transmitting a configuration of a start symbol index and a number of symbols associated with the RSSI measurement.

Aspect 27: The method of Aspect 26, wherein the start symbol index is configured such that the RSSI measurement is contained within a slot of the active DL BWP.

Aspect 28: The method of Aspect 21, wherein the second SCS is larger than the first SCS.

Aspect 29: The method of Aspect 28, further comprising, based at least in part on the second SCS, transmitting a configuration of a start symbol index and a number of symbols associated with the RSSI measurement.

Aspect 30: The method of Aspect 29, wherein the start symbol index is a first multiple of a quotient of the second SCS divided by the first SCS, and the number of symbols is a second multiple of the quotient of the second SCS divided by the first SCS.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive a configuration of a measurement resource; and
      perform a received signal strength indicator (RSSI) measurement within an active downlink (DL) bandwidth part (BWP) of the UE based at least in part on the measurement resource, wherein the active DL BWP is associated with a first subcarrier spacing (SCS), wherein the measurement resource is associated with a second SCS different from the first SCS, and wherein the one or more processors are configured to perform the RSSI measurement based at least in part on a quotient of the first SCS divided by the second SCS or a quotient of the second SCS divided by the first SCS and without utilizing a measurement gap based at least in part on the second SCS being different from the first SCS.

2. The apparatus of claim 1, wherein the measurement resource is a layer 3 (L3) measurement resource.

3. The apparatus of claim 2, wherein the L3 measurement resource is one of a channel state information (CSI) reference signal (CSI-RS) measurement resource or an L3 RSSI-specific measurement resource.

4. The apparatus of claim 1, further comprising:
   a transceiver coupled to the one or more processors, wherein the one or more processors are configured to receive the configuration of the measurement resource via the transceiver.

5. The apparatus of claim 1, wherein the measurement resource includes frequency resources, and wherein at least a portion of the frequency resources does not overlap the active DL BWP.

6. The apparatus of claim 1, wherein the second SCS is smaller than the first SCS.

7. The apparatus of claim 6, wherein the measurement resource includes a first number of symbols, wherein the RSSI measurement is performed during a second number of symbols in the active DL BWP, and wherein the second number of symbols is equal to the first number of symbols multiplied by the quotient of the first SCS divided by the second SCS.

8. The apparatus of claim 6, wherein the one or more processors are further configured to, based at least in part on the second SCS, receive a configuration of a start resource block (RB) index and a number of RBs associated with the RSSI measurement.

9. The apparatus of claim 8, wherein the start RB index is a first multiple of the quotient of the first SCS divided by the second SCS, and wherein the number of RBs is a second multiple of the quotient of the first SCS divided by the second SCS.

10. The apparatus of claim 6, wherein the one or more processors are further configured to, based at least in part on the second SCS, receive a configuration of a start symbol index and a number of symbols associated with the RSSI measurement.

11. The apparatus of claim 10, wherein the start symbol index is configured such that the RSSI measurement is contained within a slot based on the first SCS of the active DL BWP.

12. The apparatus of claim 1, wherein the second SCS is larger than the first SCS.

13. The apparatus of claim 12, wherein the one or more processors are further configured to, based at least in part on the second SCS, receive a configuration of a start symbol index and a number of symbols associated with the RSSI measurement.

14. The apparatus of claim 13, wherein the start symbol index is a first multiple of the quotient of the second SCS divided by the first SCS, and wherein the number of symbols is a second multiple of the quotient of the second SCS divided by the first SCS.

15. An apparatus for wireless communication at a base station, comprising:
a memory; and
one or more processors, coupled to the memory, configured to:
transmit, to a user equipment (UE), a configuration of a measurement resource,
wherein the measurement resource is provided to the UE for the UE to perform a received signal strength indicator (RSSI) measurement within an active downlink (DL) bandwidth part (BWP) of the UE based at least in part on the measurement resource, wherein the active DL BWP is associated with a first subcarrier spacing (SCS), wherein the measurement resource is associated with a second SCS different from the first SCS, and wherein the RSSI measurement is performed based at least in part on a quotient of the first SCS divided by the second SCS or a quotient of the second SCS divided by the first SCS and without utilizing a measurement gap based at least in part on the second SCS being different from the first SCS.

16. The apparatus of claim 15, wherein the measurement resource includes frequency resources, and wherein at least a portion of the frequency resources does not overlap the active DL BWP.

17. The apparatus of claim 15, wherein the second SCS is smaller than the first SCS, wherein the measurement resource includes a first number of symbols, wherein the RSSI measurement is performed during a second number of symbols in the active DL BWP, and wherein the second number of symbols is equal to the first number of symbols multiplied by the quotient of the first SCS divided by the second SCS.

18. The apparatus of claim 15, wherein the second SCS is smaller than the first SCS, and wherein the one or more processors are further configured to, based at least in part on the second SCS, transmit a configuration of a start resource block (RB) index and a number of RBs associated with the RSSI measurement.

19. The apparatus of claim 18, wherein the start RB index is a first multiple of the quotient of the first SCS divided by the second SCS, and wherein the number of RBs is a second multiple of the quotient of the first SCS divided by the second SCS.

20. The apparatus of claim 15, wherein the second SCS is smaller than the first SCS, and wherein the one or more processors are further configured to, based at least in part on the second SCS, transmit a configuration of a start symbol index and a number of symbols associated with the RSSI measurement.

21. The apparatus of claim 20, wherein the start symbol index is configured such that the RSSI measurement is contained within a slot of the active DL BWP.

22. The apparatus of claim 15, wherein the second SCS is larger than the first SCS, and wherein the one or more processors are further configured to, based at least in part on the second SCS, transmit a configuration of a start symbol index and a number of symbols associated with the RSSI measurement.

23. The apparatus of claim 22, wherein the start symbol index is a first multiple of the quotient of the second SCS divided by the first SCS, and the number of symbols is a second multiple of the quotient of the second SCS divided by the first SCS.

24. A method of wireless communication performed by a user equipment (UE), comprising:
receiving a configuration of a measurement resource; and
performing a received signal strength indicator (RSSI) measurement within an active downlink (DL) bandwidth part (BWP) of the UE based at least in part on the measurement resource, wherein the active DL BWP is associated with a first subcarrier spacing (SCS), wherein the measurement resource is associated with a second SCS different from the first SCS, and wherein the performing the RSSI measurement comprises performing the RSSI measurement based at least in part on a quotient of the first SCS divided by the second SCS or a quotient of the second SCS divided by the first SCS and without utilizing a measurement gap based at least in part on the second SCS being different from the first SCS.

25. The method of claim 24, wherein the measurement resource includes frequency resources, and wherein at least a portion of the frequency resources does not overlap the active DL BWP.

26. The method of claim 24, wherein the measurement resource includes frequency resources, and wherein at least a portion of the frequency resources does not overlap the active DL BWP.

27. The method of claim 24, wherein the second SCS is smaller than the first SCS.

28. A method of wireless communication performed by a base station, comprising:
transmitting, to a user equipment (UE), a configuration of a measurement resource,
wherein the measurement resource is provided to the UE for the UE to perform a received signal strength indicator (RSSI) measurement within an active downlink (DL) bandwidth part (BWP) of the UE based at least in part on the measurement resource, wherein the active DL BWP is associated with a first subcarrier spacing (SCS), wherein the measurement resource is associated with a second SCS different from the first SCS, and wherein the RSSI measurement is performed based at least in part on a quotient of the first SCS divided by the second SCS or a quotient of the second SCS divided by the first SCS and without utilizing a measurement gap based at least in part on the second SCS being different from the first SCS.

29. The method of claim 28, wherein the measurement resource includes frequency resources, and wherein at least a portion of the frequency resources does not overlap the active DL BWP.

30. The method of claim 28, wherein the second SCS is smaller than the first SCS.

\* \* \* \* \*